US012654235B2

(12) United States Patent
Heyers

(10) Patent No.: US 12,654,235 B2
(45) Date of Patent: Jun. 16, 2026

(54) METHOD AND APPARATUS FOR MACHINING A WORKPIECE

(71) Applicant: Broetje-Automation GmbH, Rastede (DE)

(72) Inventor: Christian Heyers, Edewecht (DE)

(73) Assignee: Broetje-Automation GmbH, Rastede (DE)

( * ) Notice: Subject to any disclaimer, the term of this patent is extended or adjusted under 35 U.S.C. 154(b) by 1024 days.

(21) Appl. No.: 17/637,011

(22) PCT Filed: Jun. 29, 2020

(86) PCT No.: PCT/EP2020/068225
§ 371 (c)(1),
(2) Date: Feb. 21, 2022

(87) PCT Pub. No.: WO2021/032344
PCT Pub. Date: Feb. 25, 2021

(65) Prior Publication Data
US 2022/0355391 A1     Nov. 10, 2022

(30) Foreign Application Priority Data

Aug. 21, 2019     (DE) ..................... 10 2019 122 505.1

(51) Int. Cl.
| | |
|---|---|
| *B23B 35/00* | (2006.01) |
| *B23B 47/34* | (2006.01) |
| *B23B 51/10* | (2006.01) |

(52) U.S. Cl.
CPC .............. *B23B 35/00* (2013.01); *B23B 47/34* (2013.01); *B23B 51/108* (2013.01); *B23B 2222/88* (2013.01); *B23B 2226/275* (2013.01)

(58) Field of Classification Search
CPC ......... B23B 35/00; B23B 37/00; B23B 41/06; B23B 41/16; B23B 47/34; B23B 2270/30; B23B 2270/54
See application file for complete search history.

(56) References Cited

U.S. PATENT DOCUMENTS

| | | | |
|---|---|---|---|
| 5,342,152 A | 8/1994 | Medeksza | |
| 9,776,254 B2 * | 10/2017 | Laporte | ................... B23B 47/00 |

(Continued)

FOREIGN PATENT DOCUMENTS

| | | |
|---|---|---|
| CN | 1903489 | 1/2007 |
| CN | 101758275 | 6/2010 |

(Continued)

OTHER PUBLICATIONS

Machine translation, WO 2013/088343 AI (Year: 2024).*

(Continued)

*Primary Examiner* — Nicole N Ramos
(74) *Attorney, Agent, or Firm* — Pauly, DeVries Smith & Deffner LLC

(57)     ABSTRACT

A method for machining a workpiece is provided, wherein drilling of the workpiece and subsequent countersinking of the bore, obtained by the drilling, in the workpiece are performed by means of a drilling/countersinking tool in a machining process, wherein the drilling/countersinking tool in the machining process while being axially rotated is subjected to an axial feed movement relative to the workpiece that reaches a counterbore terminal position, and wherein the axial feed movement is superimposed by an axial vibration, wherein, when reaching a predefined frequency lowering position of the axial feed movement by the drilling/countersinking tool, the frequency of the axial vibration is lowered to a final machining frequency, and the machining process is continued at the final machining fre- (Continued)

quency as the maximum frequency of the axial vibration until the counterbore terminal position is reached.

18 Claims, 4 Drawing Sheets

(56) References Cited

U.S. PATENT DOCUMENTS

| | | | | |
|---|---|---|---|---|
| 2010/0296886 A1* | 11/2010 | Prust | | B23B 47/34 |
| | | | | 408/1 R |
| 2012/0107062 A1* | 5/2012 | Moraru | | B23B 29/125 |
| | | | | 408/17 |
| 2016/0228954 A1 | 8/2016 | Lemmer et al. | | |

FOREIGN PATENT DOCUMENTS

| CN | 102548690 | 7/2012 | | |
|---|---|---|---|---|
| CN | 104129508 | 11/2014 | | |
| DE | 10335020 | 3/2005 | | |
| DE | 202005008630 | 9/2005 | | |
| DE | 102007053350 | 5/2009 | | |
| EP | 2705928 | 3/2014 | | |
| WO | WO-9952663 A1 * | 10/1999 | ............ | B23B 35/00 |
| WO | 2006120654 | 11/2006 | | |
| WO | WO-2012157468 A1 * | 11/2012 | ............ | B23B 47/34 |
| WO | 2013088343 | 6/2013 | | |
| WO | 2017087457 | 5/2017 | | |
| WO | 2018137825 | 8/2018 | | |
| WO | 2021032344 | 2/2021 | | |

OTHER PUBLICATIONS

Machine Translation of WO-9952663-A1, provided with the WO-9952663-A1 reference. (Year: 2025).*

"German Search Report," for German Patent Application No. 102019122505.1 mailed May 29, 2020 (8 pages).

"International Preliminary Report on Patentability," for PCT Application No. PCT/EP2020/068225 mailed Feb. 17, 2022 (7 pages).

"International Search Report and Written Opinion," for PCT Application No. PCT/EP2020/068225 mailed Oct. 9, 2020 (13 pages).

"Office Action," for Chinese Patent Application No. 202080059058.7 mailed Apr. 15, 2023 (10 pages), no translation.

* cited by examiner a)

b)

c)

a)

b)

METHOD AND APPARATUS FOR MACHINING A WORKPIECE

CROSS-REFERENCE TO RELATED APPLICATIONS

This application is a national stage application under 35 U.S.C. 371 of International Patent Application Serial No. PCT/EP2020/068225, entitled "Method and Apparatus for Machining a Workpiece," filed Jun. 29, 2020, which claims priority from German Patent Application No. DE 10 2019 122 505.1, filed Aug. 21, 2019, the disclosure of which is incorporated herein by reference.

FIELD OF THE TECHNOLOGY

Various embodiments relate to a method for machining a workpiece, and to a device for machining a workpiece.

The method discussed for machining by drilling and subsequent countersinking is carried out using combined drilling/countersinking tools which have a tool portion for drilling and a tool portion having a countersinking stage. The drilling/countersinking tool is subjected to an axial feed movement which reaches a counterbore terminal position. The counterbore terminal position corresponds to the axial position of the drilling/countersinking tool in which the countersinking stage engages in the workpiece to the depth envisaged for the counterbore.

BACKGROUND

In the known method for machining, from which the disclosure proceeds, the axial feed movement of the drilling/countersinking tool is superimposed by an axial vibration so as to break the chips that arise in the drilling of the workpiece. The amplitude of the axial vibration, while continuing the rotation of the drilling/countersinking tool, is decreased or canceled prior to reaching the counterbore terminal position. Smoothing of the surface in the workpiece that is generated by the countersinking is effected by decreasing or canceling the amplitude.

In the known method however, there continues to be the challenge that undesirable axial clattering of the drilling/countersinking tool associated with the drilling and the countersinking can arise. Apart from high stress to the drilling/countersinking tool, clatter marks on the surface generated by the countersinking also are created as a result of the axial clattering.

SUMMARY

The disclosure is based on the object of specifying a method for machining a workpiece by drilling and subsequent countersinking, the dimensional accuracy of the obtained bore and counterbore being further improved by said method.

The above object is achieved by the features of the disclosure.

The fundamental concept that, apart from the chip-breaking effect, a suppression of the undesirable axial clattering of the drilling/countersinking tool can also be achieved by superimposing the axial feed movement with an axial vibration is essential. According to the proposal it has been recognized that the axial vibration while lowering the frequency leads in particular to a subtraction of the clattering marks and to enhanced dimensional accuracy.

In detail, it is proposed that when reaching a predefined frequency lowering position of the axial feed movement by the drilling/countersinking tool, the frequency of the axial vibration is lowered to a final machining frequency, and the machining process is continued at the final machining frequency as the maximum frequency of the axial vibration until the counterbore terminal position is reached.

In various embodiments, when reaching the frequency lowering position, the amplitude of the axial vibration is maintained or increased, and the machining process is continued at the same or an increased amplitude until the counterbore machining terminal position is reached. The positive influence of the axial vibration in terms of the dimensional accuracy is thus further improved.

Various embodiments relate to the definition of the frequency lowering position. The final machining frequency is furthermore defined in various embodiments described herein.

Various embodiments relate to the more detailed design embodiment of the workpiece. When performing the machining process on a composite laminate material, delamination of the layers is largely avoided by way of the method according to the proposal. According to various embodiments, the method according to the proposal is moreover particularly advantageous in workpieces comprising plastics materials, in particular when countersinking in plastics materials, because the tendency of the plastics material toward fraying and splintering can be reduced.

A further optimization of the machining time and of the result of the method according to the proposal is achieved in that in the drilling the feed speed of the axial feed movement is set as a function of the axial position of the drilling/countersinking tool.

According to various embodiments, a device for machining a workpiece is provided, wherein the device is specified for carrying out the method according to the proposal. The device has a rotary drive for axially rotating the drilling/countersinking tool and a feed drive for providing the axial feed movement of the drilling/countersinking tool relative to the workpiece, as well as a controller assembly for actuating the feed drive. Reference may be made to all embodiments pertaining to the method according to the proposal.

According to various embodiments, the method according to the proposal is able to be carried out based on program instructions stored in a memory of the controller assembly of the device.

Various embodiments provide a method for machining a workpiece, wherein drilling of the workpiece and subsequent countersinking of the bore, obtained by the drilling, in the workpiece are performed by means of a drilling/countersinking tool in a machining process, wherein the drilling/countersinking tool in the machining process while being axially rotated is subjected to an axial feed movement relative to the workpiece that reaches a counterbore terminal position, and wherein the axial feed movement is superimposed by an axial vibration, wherein, when reaching a predefined frequency lowering position of the axial feed movement by the drilling/countersinking tool, the frequency of the axial vibration is lowered to a final machining frequency, and the machining process is continued at the final machining frequency as the maximum frequency of the axial vibration until the counterbore terminal position is reached.

In some embodiments, when reaching the frequency lowering position, the amplitude of the axial vibration is maintained or increased, and the machining process is continued at the same or an increased amplitude until the counterbore terminal position is reached.

In some embodiments, the frequency lowering position is defined in such a manner that the frequency lowering position is reached prior to commencing the countersinking, or in that the frequency lowering position is reached during the countersinking.

In some embodiments, the frequency lowering position is defined in such a manner that the frequency lowering position is reached after the drilling ends.

In some embodiments, the final machining frequency is lower than all of the frequencies of the axial vibration used in the machining process prior to reaching the predefined frequency lowering position.

In some embodiments, the final machining frequency is lower than the basic frequency of the axial clattering of the drilling/countersinking tool, and/or in that the final machining frequency is lower than the basic frequency of the radial oscillation of the drilling/countersinking tool.

In some embodiments, a structural aircraft component is machined as the workpiece, wherein the machining process is performed for introducing a rivet into the structural aircraft component.

In some embodiments, the machining process is performed on a composite laminate material of the workpiece.

In some embodiments, the machining process is performed on a titanium material of the workpiece, wherein the titanium material forms at least one layer of the composite laminate material of the workpiece.

In some embodiments, the machining process, such as the countersinking, is performed on a plastics material of the workpiece, wherein the plastics material forms at least one layer of the composite laminate material of the workpiece.

In some embodiments, in the drilling the feed speed of the axial feed movement is set as a function of the axial position of the drilling/countersinking tool, wherein the feed speed is set as a function of that material of the workpiece that is being machined by the drilling.

Various embodiments provide a device for machining a workpiece, in which drilling of the workpiece and subsequent countersinking of the bore, obtained by the drilling, in the workpiece are performed by means of a drilling/countersinking tool in a machining process, wherein the device has a rotary drive for axially rotating the drilling/countersinking tool and a feed drive for providing an axial feed movement of the drilling/countersinking tool relative to the workpiece, and wherein the device has a controller assembly for actuating the feed drive, wherein the device is specified for carrying out a method as described herein.

In some embodiments, the controller assembly has a memory having program instructions and at least one processor for carrying out the program instructions, and in that the memory and the program instructions, conjointly with the processor, are specified for initiating the controller assembly to actuate the feed drive so as to carry out the method as described herein by means of the device.

BRIEF DESCRIPTION OF THE DRAWINGS

The disclosure will be explained in more detail hereunder by means of a drawing which illustrates merely an exemplary embodiment. In the drawing.

DETAILED DESCRIPTION

Figure 1:
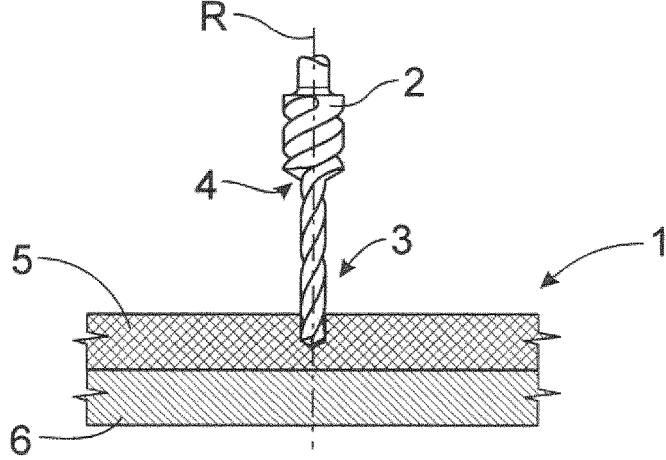
FIG. 1 shows a schematic illustration of the drilling/countersinking tool and of the workpiece a) in a first portion of the drilling, b) in a second portion of the drilling, and c) when countersinking, according to the method according to the proposal.
Figure 1:
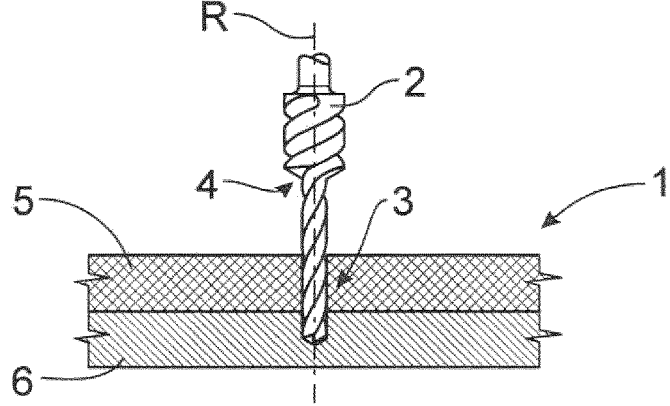
Figure 1:
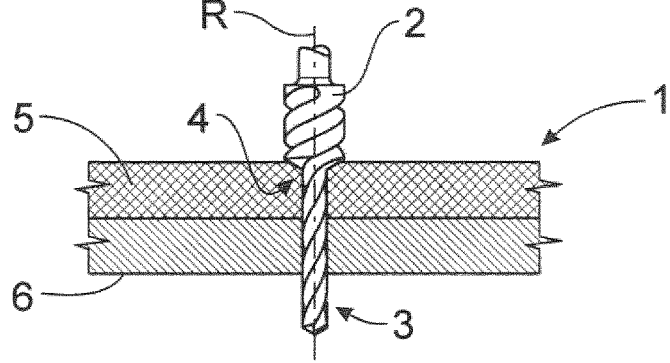

The disclosure relates to a method for machining a workpiece 1, wherein drilling of the workpiece 1 and subsequent countersinking of the bore, obtained by the drilling, in the workpiece 1 are performed by means of a drilling/countersinking tool 2 in a machining process.

A workpiece 1 in the context of the machining process is understood to be an element to be machined, and in particular a component to be machined or a semi-finished product. In the drilling, a cylindrical bore can be generated in the workpiece 1. The drilling in temporal terms is followed by the countersinking for generating a counterbore on the bore, wherein the counterbore is introduced as a profiled, such as conical, widening of the bore on at least one of the surfaces of the workpiece 1.

The drilling/countersinking tool 2 has a tool portion 3 for drilling and a tool portion 4 for countersinking the workpiece 1. The tool portion 3 for drilling, here, is configured as an approximately cylindrical spiral drill. The tool portion 4 for countersinking is profiled and, here, configured as a countersinking stage having a conical drill portion. The tool portion 4 for countersinking is likewise configured as a spiral drill, wherein the helical cutting edge of the drilling/countersinking tool 2 continues from the tool portion 3 into the tool portion 4.

In the machining process, the drilling/countersinking tool 2 is set in axial rotation. The terms "axial" and "radial" correspondingly relate to the rotation axis R of the drilling/countersinking tool 2, said rotation axis R being identical here to the axis about which the helical cutting edge of the drilling/countersinking tool 2 runs. The drilling/countersinking tool 2 is subjected to an axial feed movement and moved in the direction of the workpiece 1 along the rotation axis R. As is shown in FIG. 1a), the tool portion 3 for drilling first comes to engage with the workpiece 1 as the drilling commences. While continuing the axial feed movement in the drilling, shown in FIG. 1b), a bore which is designed as a through bore is here generated in the workpiece 1.

The countersinking is performed following the drilling, here in a single axial feed movement, and without moving the drilling/countersinking tool 2 from the workpiece 1 between and during the drilling and the countersinking. As is illustrated in FIG. 1c), the tool portion 4 by way of the countersinking stage comes to engage with the workpiece 1 when countersinking. The axial feed movement is continued up to a counterbore terminal position $S_E$ at which the axial feed movement is terminated. Upon reaching the counterbore terminal position $S_E$, the drilling/countersinking tool 2 is no longer moved axially in the direction of the workpiece 1. Rather, the drilling/countersinking tool 2 upon reaching the counterbore terminal position $S_E$ can be retracted from the generated bore and counterbore in the workpiece 1. In one design embodiment, the retraction of the drilling/countersinking tool 2 in temporal terms is carried out immediately upon reaching the counterbore terminal position. Here, and in a further design embodiment, the retraction of the drilling/countersinking tool 2 is carried out after the drilling/countersinking tool 2 has stopped at the counterbore terminal position $S_E$ for a predefined holding time. Like the bore, the counterbore obtained by the machining process, here, is approximately rotationally symmetrical about the rotation axis R of the drilling/countersinking tool 2.

The counterbore terminal position $S_E$ corresponds to the axial position of the drilling/countersinking tool 2 in which the tool portion 4 for countersinking engages in the workpiece 1 to the depth envisaged for the counterbore. The counterbore terminal position $S_E$ can be predefined by way of the geometry of the element provided for introducing into the bore, for example by way of the geometry of a rivet head of a rivet. For example, it is provided that the element provided for introduction terminates so as to be planar with the surface of the workpiece 1, or is sunk below the surface down to a predefined depth, or projects from the surface by way of a predefined height, respectively.

During the machining process, such as during the entire machining process, the axial feed movement is superimposed by an axial vibration. The drilling/countersinking tool 2 during the machining process thus carries out a movement in the axial feed direction, said movement being composed of a non-periodic axial feed speed V which can be constant at least in portions, and a periodic axial movement from the axial vibration. The axial vibration can be approximately sinusoidal, wherein however also other periodic design embodiments of the axial vibration are conceivable.

It is now essential that, when a predefined frequency lowering position $S_F$ of the axial feed movement is reached by the drilling/countersinking tool 2, the frequency f of the axial vibration is lowered to a final machining frequency $f_C$, and the machining process is continued at the final machining frequency $f_C$ as the maximum frequency f of the axial vibration until the counterbore terminal position $S_E$ is reached.

From the predefined frequency lowering position $S_F$ to the counterbore terminal position $S_E$, the axial feed movement here is superimposed by an axial vibration having a frequency f, the latter being reduced in comparison to the frequency f used prior to being lowered. The frequency f as from the predefined frequency lowering position $S_F$ to the counterbore terminal position $S_E$ may be varied but is at most the final machining frequency $f_C$. Here, and in various embodiments, the frequency f, as from the predefined frequency lowering position $S_F$ to the counterbore terminal position $S_E$, is kept constant and equal to the final machining frequency $f_C$.

Figure 2:
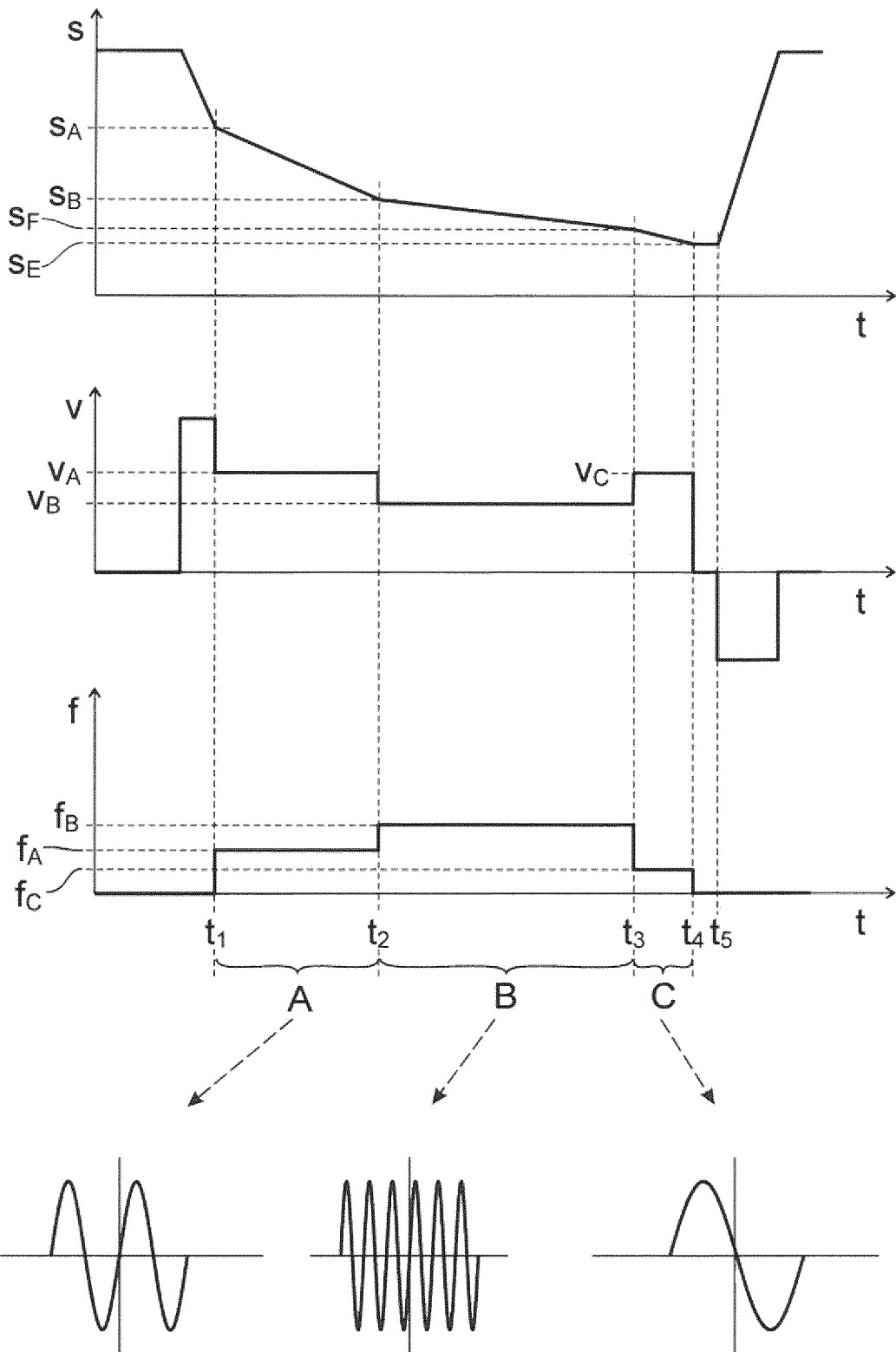
FIG. 2 shows an illustration of the axial feed movement from FIG. 1, the latter being superimposed by the axial vibration according to the method according to the proposal.

FIG. 2 shows the axial feed movement of the drilling/countersinking tool 2 when superimposed by the axial vibration. The axial position S of the drilling/countersinking tool 2 here, conjointly with the non-periodic axial feed speed V and the frequency f of the axial vibration, is illustrated over time t.

The drilling/countersinking tool 2, prior to commencing the machining process, is first moved in the axial direction toward the workpiece 1. The machining process and the drilling shown in FIG. 1a) commences from the time $t_1$, as the machining start position $S_A$ as from which the drilling/countersinking tool 2 engages in the workpiece 1 is reached. The drilling here has two drilling portions A and B which are yet to be explained in more detail hereunder. Different non-periodic axial feed speeds $V_A$, $V_B$ and different frequencies $f_A$, $f_B$ are used in the drilling portions A and B, wherein the drilling portion A ends and the drilling portion B commences at the time $t_2$ and the position $S_B$.

It is decisive here that, when the predefined frequency lowering position $S_F$ at the time $t_3$ of the axial feed movement is reached by the drilling/countersinking tool 2, the frequency f of the axial vibration is lowered to the final machining frequency $f_C$. In the present case, the frequency f is lowered from the frequency $f_B$ used in the preceding drilling portion B to the final machining frequency $f_C$. The machining process is continued at the final machining frequency $f_C$ as the maximum frequency f of the axial vibration until the counterbore terminal position $S_E$ at the time $t_4$ is reached. In various embodiments, the frequency f when reaching the predefined frequency lowering position $S_F$ is kept constant and equal to the final machining frequency $f_C$ until the counterbore terminal position $S_E$ is reached. At least part of the countersinking, and here in any case the generation of the surface of the counterbore, is thus performed at a frequency f which is lowered in relation to the preceding machining.

As the counterbore terminal position $S_E$ is reached, the drilling/countersinking tool 2 is stopped without any axial feed movement for a predefined holding time up to the time $t_5$. The drilling/countersinking tool 2 is subsequently moved out of the workpiece 1.

Figure 3:
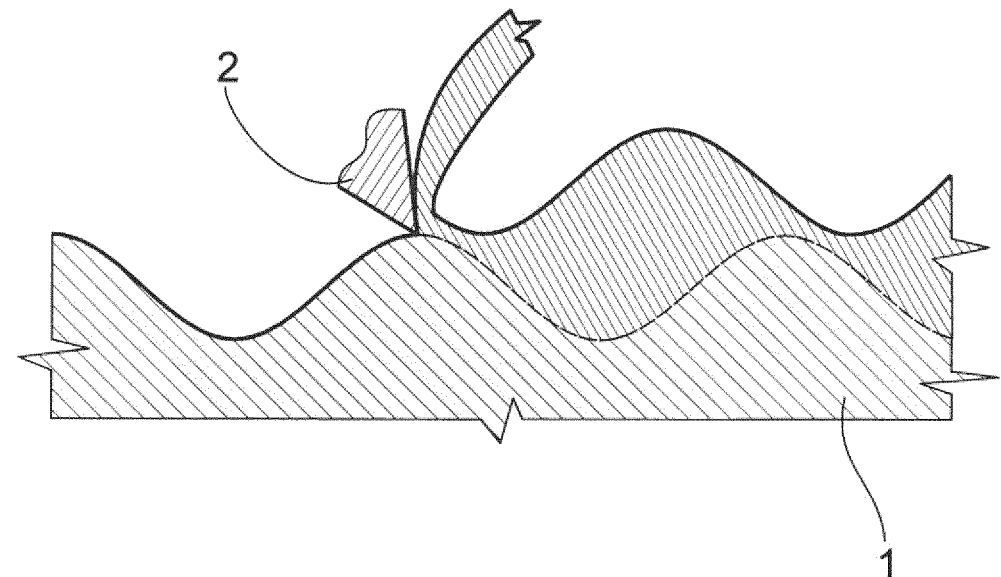
FIG. 3 shows a schematic illustration of the engagement of the drilling/countersinking tool in the material of the workpiece a) during axial clattering, and b) during the axial feed movement while being superimposed by the axial vibration.
Figure 3:
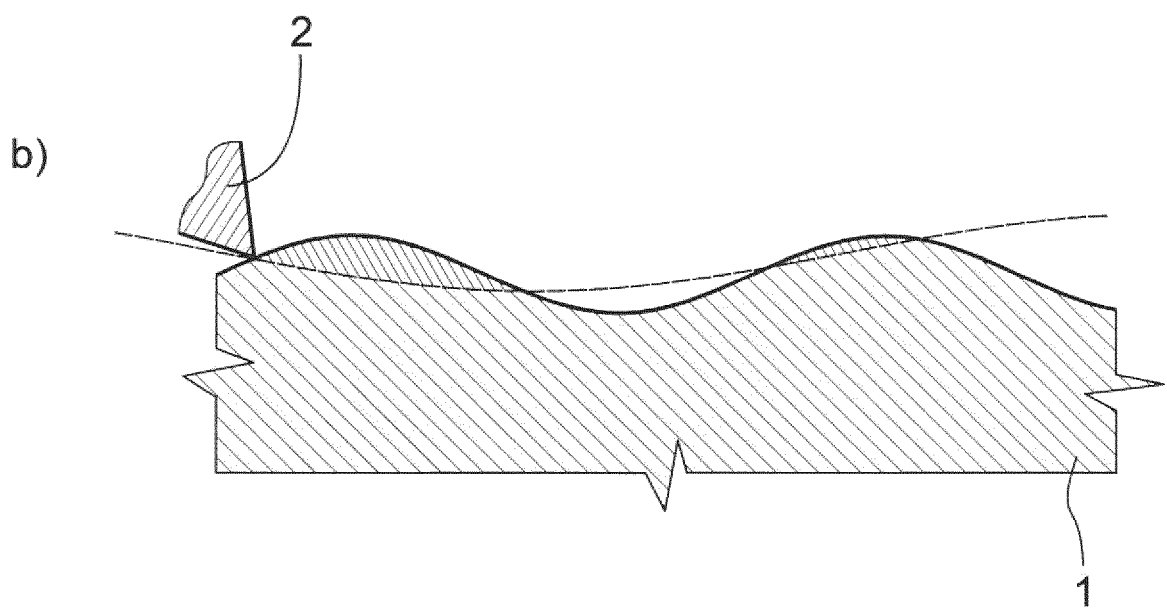

As a result of the frequency f being delimited to the final machining frequency $f_C$ at least over part of the countersinking, and herein during the generation of the surface of the counterbore, the surface quality can be improved. For the purpose of explanation, FIG. 3 schematically shows the engagement of the drilling/countersinking tool 2 in the material of the workpiece 1. The effect of axial clattering is illustrated in FIG. 3a). The torque bearing on the cutting edges of the drilling/countersinking tool 2 during an engagement causes an axial expansion of the drilling/countersinking tool 2, because the torque tends to "unwind" the spiral shape of the cutting edges. The stiffness of the drilling/countersinking tool 2 counteracts this effect. Oscillations in terms of the length of the drilling/countersinking tool 2 in the axial direction are created as a result of the interaction of the axial forces on the drilling/countersinking tool 2. FIG. 3a) shows the profile of the surface of the base of the bore along a cylindrical face about the rotation axis R. Periodic elevations in the surface are created as a result of the oscillations in terms of the length of the drilling/countersinking tool 2. The surface which is generated by the next rotation of the drilling/countersinking tool 2 as a result of the machining is indicated by the dashed line. Axial clattering of the tool is created as a function of the phase displacement of the periodic elevations in the surface and of the axial oscillation of the drilling/countersinking tool 2. This effect can also be identified in the form of so-called clatter marks in the surface generated by the counterbore.

FIG. 3b) shows the machining during the axial feed movement while superimposed by the axial vibration at a lowered frequency f. The clatter marks are removed by the rotation of the drilling/countersinking tool 2 as a result of the axial vibration with a comparatively low frequency enforced on the feed movement.

In various embodiments of the method according to the proposal, when reaching the frequency lowering position $S_F$, the amplitude of the axial vibration is maintained or increased. The machining process is continued at the same or an increased amplitude until the counterbore terminal position $S_E$ is reached. The subtraction of the clatter marks is further improved herewith.

In various embodiments, the frequency lowering position $S_F$ is defined in such a manner that the frequency lowering position $S_F$ is reached prior to commencing the countersinking. Consequently, the frequency f of the axial vibration is adapted specifically in that countersinking that is decisive for the surface of the counterbore.

However, in an alternative design embodiment, the frequency lowering position $S_F$ can also be reached during the countersinking such that an axial vibration at a high frequency f for effectively breaking the chips is present at least at the beginning of the countersinking.

In a further design embodiment, the frequency lowering position $S_F$ is defined in such a manner that the frequency lowering position $S_F$ is reached after the drilling ends. Consequently, at the end of the drilling, a comparatively high frequency f of the vibration is used for effectively breaking the chips.

In various embodiments, the frequency lowering position $S_F$ is defined in such a manner that the frequency lowering position is reached after the drilling ends and before the countersinking commences. When a through bore is incorporated in the workpiece 1 by the drilling, the drilling can already be terminated prior to the beginning of the countersinking in that the tool portion 6 for drilling exits the workpiece 1 already before the tool portion 8 for countersinking comes to engage with the workpiece 1.

Final machining frequencies $f_C$ which are lower in comparison to frequencies $f_A$, $f_B$ usually used in drilling operations with axial vibrations have proven advantageous for completing the countersinking. In a further embodiment, the final machining frequency $f_C$ is therefore lower than all of the frequencies $f_A$, $f_B$ of the axial vibration used in the machining process prior to reaching the predefined frequency lowering position $S_F$. The final machining frequency $f_C$ can be at most 70%, such as at most 30%, in particular at most 10%, of the lowest frequency $f_A$, $f_B$ of the axial vibration used prior to reaching the predefined frequency lowering position $S_F$ in the machining process.

In various embodiments the final machining frequency $f_C$ is lower than the basic frequency of the axial clattering of the drilling/countersinking tool. The axial clattering can correspondingly be counteracted by the axial vibration. Apart from axial clattering, a radial oscillation of the drilling/countersinking tool 2 can also arise, this leading to the deviation of the bore and the counterbore from an ideal rotationally symmetrical shape. Accordingly, the final machining frequency $f_C$ can be predefined by way of the basic frequency of the radial oscillation of the drilling/countersinking tool 2, wherein the final machining frequency $f_C$ is lower than the basic frequency of the radial oscillation.

One further advantageous design embodiment of the method according to the proposal lies in that a structural aircraft component is machined as the workpiece 1. A structural aircraft component is, for example, parts of a fuselage, parts of wings, or parts of an empennage of an aircraft, said components being embodied in particular as lightweight components. Riveting of the structural aircraft component can be provided, wherein the machining process is performed for introducing a rivet into the structural aircraft component. In various embodiments, riveting of the workpiece after the machining process is carried out by the method according to the proposal by means of the bore and counterbore generated in the machining process.

In one particularly advantageous design embodiment, the machining process is performed on a composite laminate material of the workpiece 1. The axial feed movement here can run so as to be approximately perpendicular to the planes of the layers of the composite laminate material, and a plurality of layers can be machined using the machining process. In various embodiments, composite laminate materials have layers of titanium materials and plastics materials.

Moreover, the machining process can be performed generally on a titanium material of the workpiece, wherein part of the workpiece or the entire workpiece is embodied from a titanium material. A titanium material here is understood to be titanium and alloys comprising titanium as the primary alloy element, as well as titanium composite materials.

When the machining process, such as the countersinking, is performed on a plastics material of the workpiece, fraying and splintering of the plastics material can be effectively avoided by way of the method according to the proposal. Part of the workpiece, or the entire workpiece, can be embodied from a plastics material. In various embodiments, examples of plastics materials are fiber-reinforced plastics and in particular carbon-fiber-reinforced plastics.

Accordingly, FIG. 1 shows a workpiece 1 which is formed by a composite laminate material. The workpiece has a first layer 5 of carbon-fiber-reinforced plastic, and a second layer 6 of titanium. The drilling is performed through the first layer 10 and the second layer 12, while a counterbore in the first layer 10 of carbon-fiber-reinforced plastic is generated in the countersinking.

According to various embodiments, in the drilling the feed speed V of the axial feed movement is set as a function of the axial position of the drilling/countersinking tool 2, wherein the feed speed V can be set as a function of that material of the workpiece 1 that is machined by the drilling. The drilling presently has two drilling portions A and B, wherein in the drilling portion A the bore is introduced into the first layer 10, and in the drilling portion B the bore is introduced into the second layer 12. Different non-periodic axial feed speeds $V_A$, $V_B$ are provided in the drilling portions A and B, wherein the first layer 10 of carbon-fiber-reinforced plastic is machined at a higher axial feed speed $V_A$. Likewise, different frequencies $f_A$, $f_B$ are used for the axial vibration, said frequencies $f_A$, $f_B$ being in each case adapted to those materials of the workpiece that are machined by the drilling. The result of the drilling can thus be improved while simultaneously reducing the machining time. In a further design embodiment, the axial feed speed $V_C$ is in turn set for the countersinking, here to a higher axial feed speed $V_C$ than in the preceding drilling.

Figure 4:
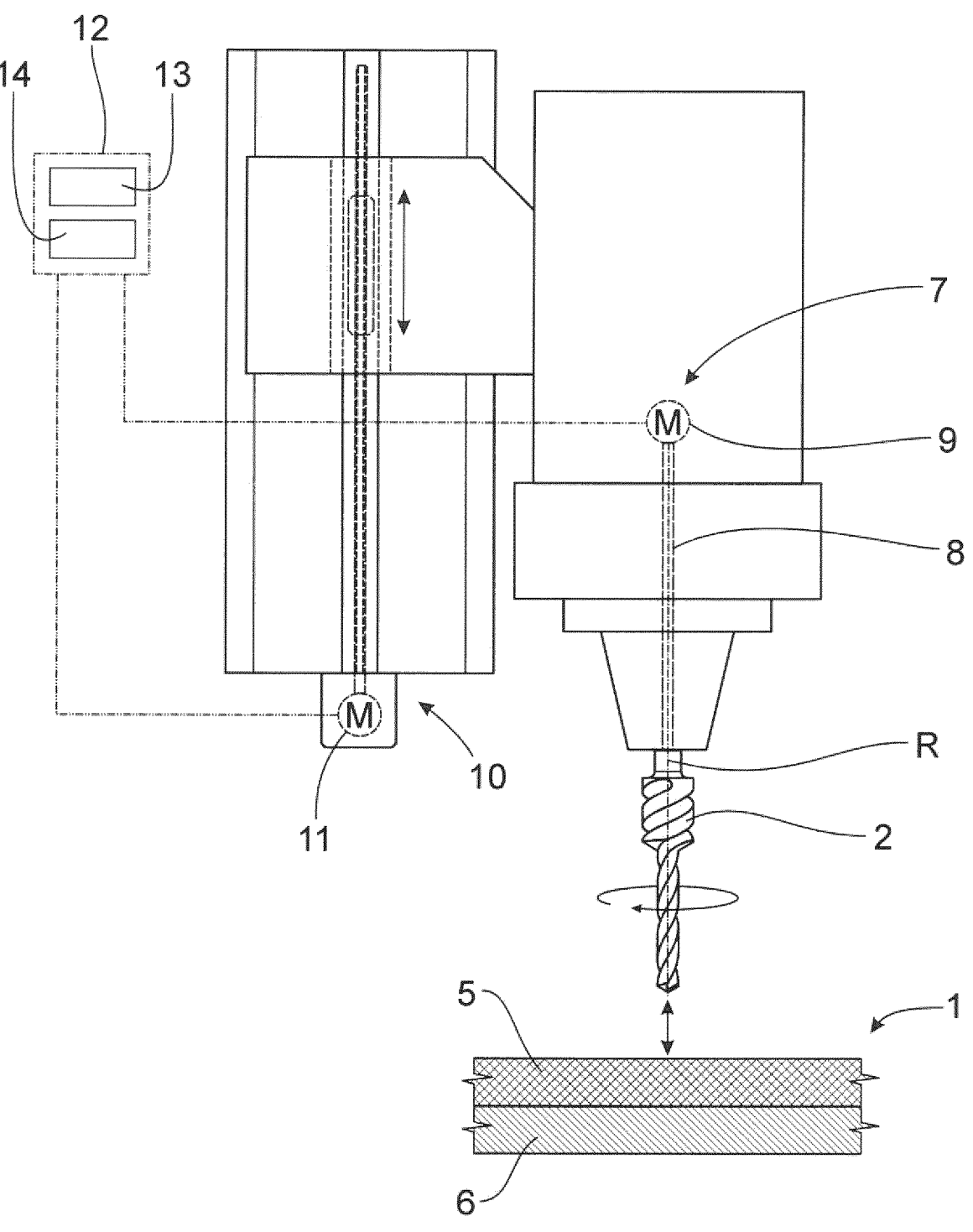
FIG. 4 shows a device according to the proposal for carrying out the method according to the proposal.

According to a further teaching, a device for the subtractive machining of a workpiece is provided. To this end, FIG. 4 shows a design embodiment of the device which is specified for carrying out a machining process by means of a drilling/countersinking tool 2, by drilling the workpiece 1 and subsequently countersinking the bore, obtained by the drilling, in the workpiece 1.

The device has a rotary drive 7 for axially rotating the drilling/countersinking tool 2. Presently provided is a rotatably mounted tool spindle 8 which receives the drilling/countersinking tool 2 and is driven by a rotating motor 9. The tool spindle 8 and the drilling/countersinking tool 2 conjointly rotate about the rotation axis R when the rotary drive 7 is actuated. The device has a feed drive 10 for providing the axial feed movement of the drilling/countersinking tool 2 relative to the workpiece 1. The feed drive 10 has a feed motor 11 and is specified for repositioning in the axial direction the rotary drive 7 conjointly with the tool spindle 8 and the drilling/countersinking tool 2. The device has a controller assembly 12 for actuating the feed drive 10. Presently, the controller assembly is likewise specified for actuating the rotary drive 7.

It is essential that the device according to the proposal is specified for carrying out the method according to the proposal. The controller assembly can in particular be specified for providing the axial feed movement and the superimposition by an axial vibration. In various embodiments, the axial vibration is also carried out by actuating the feed drive 10 by means of the controller assembly 12. Reference may be made to all embodiments pertaining to the method according to the proposal.

In various embodiments, the controller assembly 12 has a memory 13 having program instructions and at least one processor 14 for carrying out the program instructions.

Program instructions which permit the method according to the proposal to be carried out are stored in the memory 13 here. The memory 13 and the program instructions, conjointly with the processor 14, are specified for initiating the controller assembly 12 to actuate the feed drive 10 so as to carry out the method according to the proposal by means of the device according to the proposal.

The invention claimed is:

1. A method for machining a workpiece, wherein drilling of the workpiece and subsequent countersinking of a bore, obtained by the drilling, in the workpiece are performed by a drilling/countersinking tool in a machining process, wherein the drilling/countersinking tool in the machining process while being axially rotated is subjected to an axial feed movement relative to the workpiece that reaches a counterbore terminal position, and wherein the axial feed movement is superimposed by an axial vibration, wherein, when a predefined frequency lowering position of the axial feed movement by the drilling/countersinking tool is reached, a frequency of the axial vibration is lowered to a final machining frequency, and the machining process is continued at the final machining frequency as a maximum frequency of the axial vibration until the counterbore terminal position is reached.

2. The method as claimed in claim 1, wherein, when reaching the frequency lowering position, an amplitude of the axial vibration is maintained or increased, and the machining process is continued at the same or an increased amplitude until the counterbore terminal position is reached.

3. The method as claimed in claim 1, wherein the frequency lowering position is defined in such a manner that the frequency lowering position is reached prior to commencing the countersinking, or in that the frequency lowering position is reached during the countersinking.

4. The method as claimed in claim 1, wherein the frequency lowering position is defined in such a manner that the frequency lowering position is reached after the drilling ends.

5. The method as claimed in claim 1, wherein the final machining frequency is the lowest frequency of the axial vibration used in the machining process prior to reaching the predefined frequency lowering position.

6. The method as claimed in claim 1, wherein the final machining frequency is lower than a basic frequency of an axial clattering of the drilling/countersinking tool, and/or in that the final machining frequency is lower than a basic frequency of a radial oscillation of the drilling/countersinking tool.

7. The method as claimed in claim 1, wherein a structural aircraft component is machined as the workpiece.

8. The method as claimed in claim 1, wherein the machining process is performed on a composite laminate material of the workpiece.

9. The method as claimed in claim 8, wherein the machining process is performed on a titanium material of the workpiece.

10. The method as claimed in claim 8, wherein the machining process is performed on a plastics material of the workpiece.

11. The method as claimed in claim 1, wherein, in the drilling, a feed speed of the axial feed movement is set as a function of the axial position of the drilling/countersinking tool.

12. A device for machining a workpiece, in which drilling of the workpiece and subsequent countersinking of the bore, obtained by the drilling, in the workpiece are performed by a drilling/countersinking tool in a machining process, wherein the device has a rotary drive for axially rotating the drilling/countersinking tool and a feed drive for providing an axial feed movement of the drilling/countersinking tool relative to the workpiece, and wherein the device has a controller assembly for actuating the feed drive, wherein the device is specified for carrying out a method as claimed in claim 1.

13. The device as claimed in claim 12, wherein the controller assembly has a memory having program instructions and at least one processor for carrying out the program instructions, and in that the memory and the program instructions, conjointly with the processor, are specified for initiating the controller assembly to actuate the feed drive so as to carry out the method as claimed in one of the preceding claims by the device.

14. The method as claimed in claim 7, wherein the machining process is performed for introducing a rivet into the structural aircraft component.

15. The method as claimed in claim 9, wherein the titanium material forms at least one layer of the composite laminate material of the workpiece.

16. The method as claimed in claim 10, wherein the machining process is countersinking.

17. The method as claimed in claim 10, wherein the plastics material forms at least one layer of the composite laminate material of the workpiece.

18. The method as claimed in claim 11, wherein the feed speed is set as a function of a material of the workpiece that is being machined by the drilling.

* * * * *